April 28, 1925.
C. G. SPENCER
1,535,185
ELECTROLYTIC APPARATUS
Original Filed Jan. 26, 1920    3 Sheets-Sheet 2
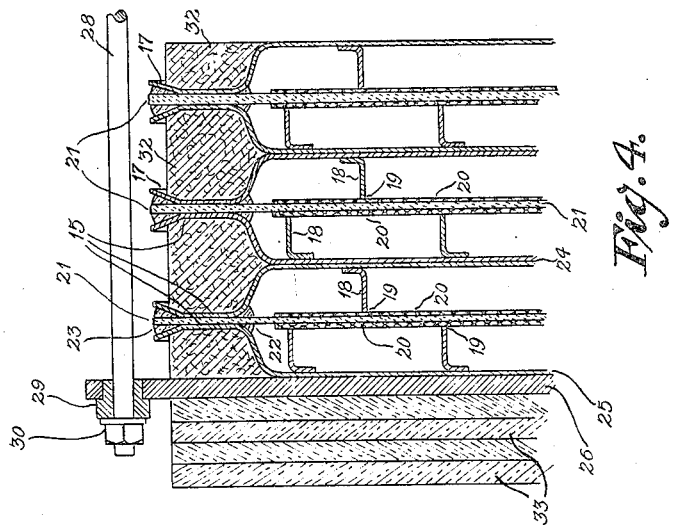
Inventor
C. G. Spencer.
By
his Attorney April 28, 1925.
C. G. SPENCER
ELECTROLYTIC APPARATUS
Original Filed Jan. 26, 1920   3 Sheets-Sheet 3
1,535,185
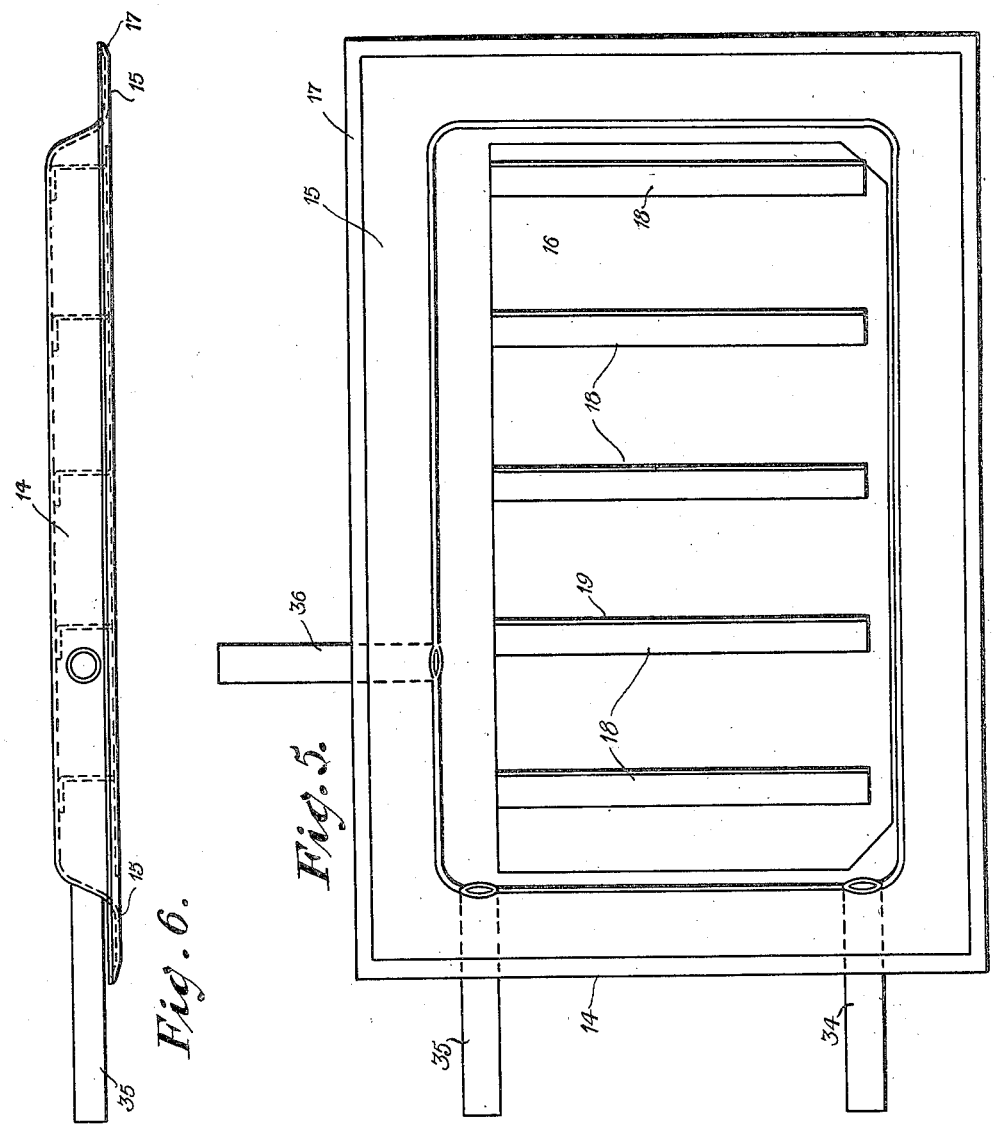
Inventor
C. G. Spencer.
By
his Attorney Patented Apr. 28, 1925.

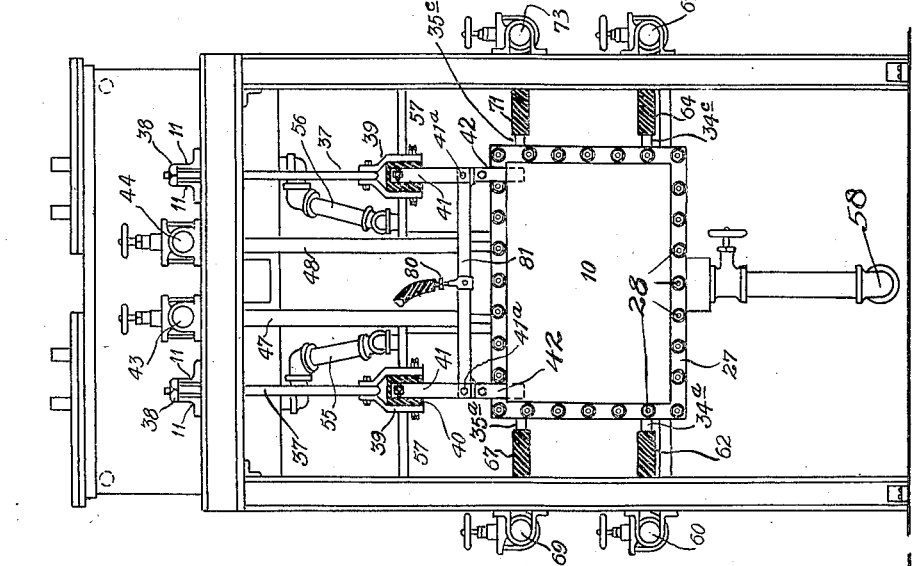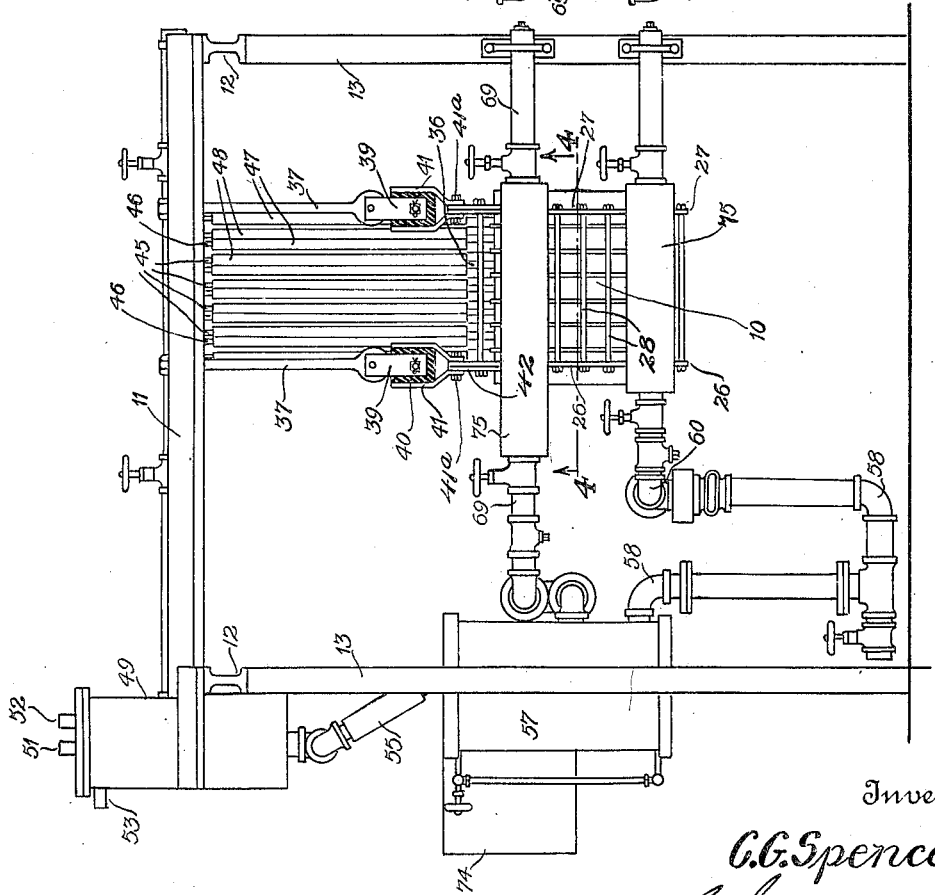

1,535,185

UNITED STATES PATENT OFFICE.

CLARENCE G. SPENCER, OF NEW YORK, N. Y., ASSIGNOR, BY MESNE ASSIGNMENTS, TO JOHN P. SCOTT, OF TORONTO, CANADA.

ELECTROLYTIC APPARATUS.

Application filed January 26, 1920, Serial No. 354,015. Renewed March 10, 1922. Serial No. 542,815.

*To all whom it may concern:*

Be it known that I, CLARENCE G. SPENCER, citizen of the United States, residing at New York, county of New York, and State of New York, have invented certain new and useful Improvements in Electrolytic Apparatus; and I do hereby declare the following to be a full, clear, and exact description of the invention, such as will enable others skilled in the art to which it appertains to make and use the same.

This invention relates to electrolytic apparatus; and it is concerned more particularly with electrolytic apparatus suitable for the manufacture of hydrogen and oxygen by electrolysis of water. In general the apparatus is of a type in which a plurality of cell sections are assembled to form a multi-cell unit or battery of cells electrically connected in series.

It is a principal object of the present invention to provide electrolytic apparatus of the general character described which is capable of operating at high current densities and also at comparatively high temperatures, whereby a large output of hydrogen and oxygen is obtainable with a relatively small compact apparatus. In order to operate an electrolytic apparatus in this manner at a satisfactory output rate and energy efficiency it is important to conserve as far as possible the heat developed by electrolysis, and the present invention therefore makes special provision for effective heat insulation of the apparatus.

With apparatus of the character described, difficulty is often experienced in effectively insulating the cells electrically from ground, and this is especially true where the current supply is drawn from a grounded system such as a 3-wire system. Another important object of the invention is therefore to make provision whereby effective electrical insulation of the cells from ground can be achieved in a satisfactory and easy manner.

Another object of the invention is to provide apparatus so designed that the cell unit or units, each consisting of a plurality of cells in series as above described, can be removed for repair or inspection and returned to position or replaced by a similar unit, with very little difficulty and with the minimum disturbance of the various connections concerned.

Still another object of the invention is to provide an improved design of the component cell members which make up the cells assembled in a unit or battery, whereby such parts can be made with accuracy but at small expense, and can be assembled readily into units in which the joints between component cell members can be made and kept perfectly tight while at the same time permitting expansion and contraction due to changes in temperature.

With these and other objects in view, the nature of which will be more fully apparent hereinafter, the invention comprises the novel features of construction hereinafter set forth and more particularly pointed out in the claims.

In order to afford a full understanding of the underlying principles of the invention, an especially desirable embodiment thereof is illustrated in the accompanying drawings and explained in detail in the following description; but it is to be understood that the specific apparatus shown is only typical of apparatus coming within the broad invention, which is not limited to the particular apparatus shown.

In the accompanying drawings,

Fig. 1 is a side elevation of apparatus embodying the invention;

Figs. 2 and 3 are an end view and plan view, respectively, of the apparatus of Fig. 1;

Fig. 4 is a partial section on the line 4—4 of Fig. 1, on an enlarged scale, showing certain details of the cell construction and arrangement, and Figs. 5 and 6 are a front view, and a top edge view, respectively, of a half-cell section or electrode-supporting means, also on a larger scale.

The apparatus here illustrated, involves a single group, or so-called unit, of six cells arranged in series, but it is to be understood that apparatus within the invention may comprise a plurality of such units, each consisting of six or any other convenient number of cells. In Figs. 1, 2 and 3, the unit is represented generally by reference numeral 10 and is suspended, by means to be more fully described hereinafter, from two pairs of overhead longitudinal members 11 of a suitable supporting framework, said framework including also the cross members 12 and uprights 13, all suitably connected together to provide rigid supporting means, which may be insulated from ground in any suitable manner unnecessary to illustrate here. In practice, the framework may either be built of structural steel shapes, or it may be wholly or partly built of wood in order to facilitate insulation of the unit from ground.

The detailed construction of the cells and the mode of assembling the same into a unit are illustrated more particularly in Figs. 4, 5 and 6, where 14 represents generally a half-cell section of sheet metal of the proper character shaped in a die, for example, into a dished plate having a substantially plane annular flange or abutment face 15, surrounding a central recessed portion 16, said flange 15 flaring slightly to the rear at its outer edge as indicated at 17. Spot-welded or otherwise suitably secured to the inner face of the dished portion 16 are vertical electrode-supporting members 18, in this instance angle bars, the front edges 19 of which are in substantially the same plane which is preferably slightly to the rear of the plane of the abutment flange 15, as shown. Said members 18 are adapted and arranged to support and space away from the half-cell wall, the electrode proper, that is to say, the active part of the complete electrode structure, of which the half-cell section and its attached parts can be considered to constitute the whole. The electrode proper, indicated at 20 (Fig. 4) is of a permeable or foraminous type, and consists in this instance of metallic wire mesh spot-welded or otherwise properly secured to the front edges 19 of the supporting members 18. The space between the electrode proper and its cooperating half-cell wall ensures free circulation of electrolyte to the rear of the permeable electrode surface.

By assembling two of the half-cell structures with the plane marginal flanges 15 mating, but spaced apart by a diaphragm 21 of asbestos cloth, for example, a cell is formed consisting of anode and cathode chambers separated by said diaphragm, the margin of which may be rubberized or otherwise impregnated with impervious and insulating material. The arrangement is evidently such that when the cell sections are assembled and their margins firmly pressed against the margins of the interposed diaphragm, the wire mesh electrodes 20, one an anode and the other a cathode, also engage said diaphragm, being separated only by the thickness thereof, say one-eighth of an inch. Said wire mesh electrodes comprise in this instance a single layer of heavy wire cloth or fabric. The joints between the cell sections may be luted both internally and externally with a suitable insulating mastic, as indicated at 22 and 23, to render them tight. Any desired number of these cells may be assembled back to back as shown in Fig. 4 to constitute a unit, the abutting cell walls being most desirably spot-welded together in order to ensure good metallic contact. The composite or double plate thus formed as indicated at 24 (Fig. 4) between abutting cells, thus constitutes in effect a bipolar electrode member; while the plates at opposite ends of the group of cells constituting a unit, such as the plate indicated at 25, are unipolar electrode members. The group of cells thus assembled are firmly held in a compact unitary structure between conducting end plates 26 and 27, the margins of which project beyond the edges of the cell sections to provide anchorage for through tension bolts 28. Said bolts are insulated from the plates by insulating bushings 29, and tightening nuts 30 are provided for drawing the cell sections together to the necessary extent. The wall 25 of each end half-cell of the unit is spot-welded or otherwise in good metallic union with the corresponding adjacent assembling plate 26 or 27. The spaces afforded between the flanges 15 of the assembled half-cell sections may be readily filled with insulating material 32 of any suitable character, a concrete composition, if desired, serving this purpose admirably. In this connection it is to be noted that the rearwardly flaring flange peripheries 17 also serve as effective and convenient retaining means.

It will be observed that the curvature of the sheet metal half-cell members in cross section allows considerable expansion and contraction of the assemblage of cells as a whole without impairing the integrity of the joints between the tightly clamped flanges. This is a consideration of great practical importance.

Each of the half-cell sections is provided near the lower part of the dished or recess portion with an electrolyte intake 34 which, as here shown, may take the form of a short length of metal pipe secured, as by welding, in a suitable opening provided in the cell section. Similarly, an electrolyte offtake 35 is provided in the upper part of the cell section. Each half-cell is also provided with a gas offtake 36 at the top, for leading off hydrogen or oxygen, depending upon whether the half-cell is a cathode chamber or an anode chamber. This gas offtake may be of the same character as the electrolyte intake and offtake already described. By arranging the intake and offtake connections all on one side or the other of a median line, all the half-cells may be identical in construction; and when a number of the sections are assembled into a plurality of cells to form a unit, all the anode chamber connections come on one side of the unit, and all the cathode chamber connections come on the opposite side. This is a matter of great practical convenience and economy.

As before stated, the unit is suspended from overhead members 11 of the supporting framework. This method of mounting the unit accomplishes several very desirable results. In the first place, electrical insulation of the unit from ground is thereby greatly simplified; and at the same time the unit can thus be made easily removable and replaceable when necessary, with a minimum of difficulty and disturbance of connections.

In the present example, the suspending means for the unit comprises four rods 37, each of which carries at its threaded upper end a nut 38, bearing on the upper edges of the two pairs of longitudinal frame members 11, the members of each pair being spaced apart to permit the rods 37 to extend upwardly therebetween. The lower end of each rod 37 is provided with a yoke or stirrup 39, which embraces a block of insulation 40 and is suitably secured thereto, preferably by a pin or other means affording a removable pivotal connection between the parts. To said insulating block is also secured in a similar manner another yoke or stirrup member 41, the bifurcated lower end of which embraces and is secured both to the upper edge of plate 26 (or 27), and to the metal strap 42, by means of a bolt 41$^a$ extending through said plate and strap, which latter may be welded or otherwise suitably secured together in good electrical contact. It will be noted that the described insulating block, with the yokes or stirrups connected thereto, constitutes a familiar type of strain insulator commonly used in other connections. By suspending a unit in this manner, and properly adjusting the nuts 38 to hold the unit at the proper height, the connection of the unit to the various other parts of the system to be hereinafter described is greatly facilitated.

Suitable means are provided for separately leading off the hydrogen and oxygen from the cathode and anode chambers of the unit, respectively; also means for supplying electrolyte to the cell chambers and leading electrolyte therefrom in systematic circulation. Suitably supported on the upper part of the apparatus framework are the gas offtake mains or headers 43 and 44, 43 being the oxygen main offtake in this instance, and 44 being the hydrogen main offtake. Each of these offtakes is provided with a set of branch tubes or nipples adapted for connection respectively, with the corresponding set of gas offtakes 36 with which the half-cells are provided. In Fig. 1, 45 are the connecting nipples provided on offtake 43, while 46 indicates those provided on offtake 44. The oxygen offtake tubes of the anode chambers are connected to tubes 45 on the offtake main 43, by sections 47 of rubber hose or other suitable non-conducting tubing; while similar pieces of rubber hose or the like, 48, connect the hydrogen offtakes of the cathode chambers to tubes 46 with which the offtake main 44 is provided. The offtake mains 43 and 44 lead respectively into separate tanks 49 and 50, 49 being for oxygen and 50 for hydrogen. These separate tanks are in the nature of coolers, and in them the moisture carried away from the cells by the warm gases may be largely condensed and deposited. These tanks may be provided if desired with cooling coils to which cooling fluid may be supplied through inflow and outflow tubes 51 and 52. Oxygen and hydrogen, freed of the greater part of their contained moisture in the respective coolers, may be led away through outlet pipes 53 and 54, respectively, to gas holders or other suitable storage means, while condensed moisture flows from the tanks 49 and 50 through down-pipes 55 and 56, respectively, into electrolyte tank 57. From this electrolyte tank, suitable piping supplies electrolyte to the anode and cathode compartments, respectively, of the unit 10. In the present instance, this piping system comprises a pipe 58 which branches at 59, into an anolyte supply pipe 60, and a catholyte supply pipe 61. Suitable connecting nipples (not shown) with which the anolyte supply pipe is provided are respectively connected by flexible non-conducting tubes 62 of rubber hose or the like to the anolyte intakes 34$^a$; while similar rubber hose connections 64 supply catholyte from pipe 61 to the catholyte intakes 34$^c$. The heat developed within the cells causes the electrolyte to flow upward on both sides of each diaphragm, the anolyte passing out through the anolyte offtakes 35$^a$, rubber hose connections 67, and connecting nipples 68 into the anolyte return pipe 69 and thence into the electrolyte tank 57. Similarly, catholyte passes out through the catholyte offtakes 35$^c$, and rubber hose connections 71, into connecting nipples 72 of the catholyte return pipe 73, which also leads to the electrolyte tank 57. The anolyte and catholyte returns 69 and 73 may enter the electrolyte tank 57 at points widely spaced apart; whereby any oxygen and hydrogen entrained in the anolyte and catholyte, respectively, returning from the respective anode and cathode chambers may be separated before the anolyte and catholyte are fed back to the cells. Structurally separate anolyte and catholyte tanks may be employed if desired.

Where it is desired to operate with the electrolyte at relatively high temperature, due to the heat developed by the passage of a current of high density, it is of course desirable to prevent loss of heat through the exposed portions of the electrolyte circulating system. To this end, the piping may be covered with asbestos or other suitable heat-insulating material as indicated at 75.

Connections for supply of current to the unit may be arranged in any convenient manner. In the present instance, the positive terminal is at 78, being carried on a conductive bar 79 of copper or the like, said bar being electrically connected to the end plate 26 through members 42 of the buswork at that end of the battery. Similarly, the negative terminal 80 is carried on a conductive bar 81, electrically connected to the end plate 27.

The various parts of the gas and electrolyte piping systems are provided with suitable valves as indicated, whereby the flow of gas and electrolyte can be suitably controlled.

The material of which the half-cell sections are made may be sheet steel of relatively light gauge which can be easily pressed into the desired shape by means of suitable dies. If considered desirable in any given instance, the half-cell sections to be used in the anode structures may be of steel nickeled, or may be made of sheet nickel; and similarly for the wire mesh anodes proper and their supporting members 18. The use of nickel or nickeled anodes is not essential, however.

In practice, electrolytic apparatus constructed in accordance with the invention can be operated at high current densities, from one to four amperes per square inch of projected electrode area, for example; caustic soda being most desirably used as the electrolyte and the electrolyte being maintained at a temperature determined by the density of the current.

When it is desired to remove the unit 10 for repair or replacement, it is only necessary to uncouple the hose connections 47, 48, 62, 64, 67, 71, and to remove the pins connecting either stirrups 39 or stirrups 41 to the insulating blocks 40 or to remove the four bolts 41ª, whereupon the unit may be lowered below the level of pipes 60 and 61 and moved out through either side of the frame. Thus, when a number of such units are suspended end to end from the bars 11, any one of the units can be easily removed without disturbing any of the others.

What I claim is:

1. Electrolytic apparatus comprising, in combination, a plurality of dished half-cell sections, each having a marginal abutment flange projecting outwardly beyond the dished portion, assembled in cooperating pairs with a separating diaphragm interposed between the sections of each pair, and means holding the assemblage together in a unitary structure with the flanges of each pair of sections pressed tightly against their separating diaphragm.

2. Electrolytic apparatus comprising, in combination, a plurality of dished half-cell sections, each formed of sheet metal and provided with a plane-surfaced marginal abutment flange projecting outwardly beyond the dished portion, assembled in cooperating pairs with a separating diaphragm interposed between the sections of each pair, and means holding the assemblage together in a unitary structure with the flanges of each pair of sections pressed tightly against their separating diaphragm.

3. Electrolytic apparatus comprising, in combination, a plurality of dished half-cell sections, each having a plane-surfaced marginal abutment flange projecting outwardly beyond the dished portion, assembled in cooperating pairs with a separating diaphragm interposed between the sections of each pair, and means holding the assemblage together in a unitary structure with the flanges of each pair of sections pressed tightly against their separating diaphragm, the flanges of such pair being flared apart peripherally.

4. Electrolytic apparatus comprising, in combination, a plurality of dished half-cell sections, each having a plane-surfaced marginal abutment flange projecting outwardly beyond the dished portion, assembled in cooperating pairs with a separating diaphragm interposed between the sections of each pair, and means holding the assemblage together in a unitary structure with the flanges of each pair of sections pressed tightly against their separating diaphragm, the flanges of such pair being flared apart peripherally, and insulating material disposed in the spaces between successive pairs of flanges.

5. Electrolytic apparatus comprising the combination, with supporting means, of a unitary cell structure, and means whereby said cell structure is removably suspended from said supporting means.

6. Electrolytic apparatus comprising the combination, with supporting means, of a unitary cell structure, and means whereby said cell structure is suspended and insulated from said frame.

7. Electrolytic apparatus comprising the combination, with supporting means, of a unitary cell structure, and means, including strain insulator means, whereby said cell structure is removably suspended from said supporting means.

8. An electrolytic cell comprising a pair of cooperating dished half-cell sections having mating flanges projecting outwardly beyond the dished portions and marginally engaging a separating diaphragm, and a pair of electrode members disposed on opposite sides of said diaphragm, each such member being secured to the inner wall of its respective half-section.

9. An electrolytic cell comprising a pair of cooperating dished half-cell sections having mating flanges projecting outwardly beyond the dished portions and marginally engaging a separating diaphragm, and a pair of permeable electrode members engaging opposite sides of said diaphragm, each of said electrode members being supported by means secured to the inner wall of its respective half-section and spacing said electrode member from said wall.

10. An electrolytic cell comprising a pair of cooperating dished half-cell sections having mating flanges projecting outwardly beyond the dished portions and marginally engaging a separating diaphragm, a pair of metal wire mesh electrode members engaging opposite sides of said diaphragm, and supporting means for each electrode member comprising conductive means united thereto and to the inner wall of the corresponding half-section and spacing them apart.

11. An electrolytic cell comprising a pair of cooperating dished half-cell sections having mating flanges projecting outwardly beyond the dished portions and marginally engaging a separating diaphragm, a pair of metal wire mesh electrode members engaging opposite sides of said diaphragm, and supporting means for each electrode member comprising metal bars secured thereto and to the inner wall of the corresponding half-section and spacing them apart.

12. An electrolytic cell section comprising a dished plate having a plane-surfaced marginal flange flared at its periphery.

13. An electrolytic cell section comprising a plate having a dished portion surrounded by a flange projecting outwardly beyond the dished portion, in combination with electrode means mounted on said dished portion.

14. An electrolytic cell section comprising a plate having a dished portion surrounded by a flange projecting outwardly beyond the dished portion, in combination with a foraminous electrode member, and means securing said member to but spacing it from said dished portion.

15. An electrolytic cell section comprising a plate having a dished portion surrounded by a flange projecting outwardly beyond the dished portion, in combination with a metal fabric electrode member supported substantially in the plane of said flange by means secured to said dished portion.

16. An electrolytic cell member comprising a dished plate having a flange and provided with a gas offtake, and electrolyte inlet and offtake, all disposed on the same side of a median line through said member.

17. Electrolytic apparatus comprising, in combination, a plurality of cells assembled in a unitary structure, and intake and offtake means serving said cells, including manifolds extending longitudinally of said structure along the sides thereof.

18. Electrolytic apparatus comprising, in combination, a plurality of assembled cells, inlet and offtake means extending longitudinally and laterally of the cell assembly, and inlet and offtake connections extending substantially horizontally between said cells and said means.

19. Electrolytic apparatus, comprising suspended cell-forming members, stationary means from which the members are suspended, stationary means from which electrolyte is supplied to the cell formed of the members, stationary means for receiving electrolytic products from the cell, in combination with inlet and offtake means between the cell and said supply and receiving means for supplying electrolyte to the cell and for directing electrolytic products from the cell to the receiving means.

20. Electrolytic apparatus, comprising a support, cell forming members suspended from the support, a stationary tank for receiving electrolyte from the cell formed by the members, in combination with flexible inlet and offtake means between the tank and cell whereby electrolyte may be returned to the cell, a tank for receiving gas from the electrolyte tank, and flexible gas offtake means between said tanks.

21. Electrolytic apparatus comprising a support, a cell suspended from the support, a tank carried by the support and adapted to receive electrolyte from the cell, a receptacle carried by the support and adapted to receive gas from the tank, flexible and insulating means for carrying electrolyte from the cell to the tank, flexible and insulating means for returning electrolyte from the tank to the cell, and flexible and insulating means for conducting the gas from the tank to the receptacle.

In testimony whereof I hereunto affix my signature.

CLARENCE G. SPENCER.